Fig. 1

INVENTOR.
LEWIS L. TANGUY, JR.

Dec. 17, 1963   L. L. TANGUY, JR   3,114,902
ITEM TRANSPORT MONITORING SYSTEM
Filed Dec. 24, 1959   6 Sheets-Sheet 2

Fig. 2

INVENTOR.
LEWIS L. TANGUY, JR.
BY William E. Cleaver
ATTORNEY

Dec. 17, 1963     L. L. TANGUY, JR     3,114,902
ITEM TRANSPORT MONITORING SYSTEM
Filed Dec. 24, 1959     6 Sheets-Sheet 6

INVENTOR.
LEWIS L. TANGUY, JR.
BY
*William E. Cleaver*
ATTORNEY

United States Patent Office 3,114,902
Patented Dec. 17, 1963

3,114,902
ITEM TRANSPORT MONITORING SYSTEM
Lewis L. Tanguy, Jr., Phoenixville, Pa., assignor to Burroughs Corporation, Detroit, Mich., a corporation of Michigan
Filed Dec. 24, 1959, Ser. No. 861,963
10 Claims. (Cl. 340—259)

This invention relates to automatic item transport systems, and more particularly to a monitoring arrangement for detecting the movement of items transported by such a system and for providing signals signifying whether or not the system is properly operating.

When work is performed on items in an automatic process, it is often necessary to transport the items along a path through many stations where the work is performed. At each of the stations the item is subjected to certain physical and/or analytical operations, and it is then moved on to the next station. For instance, when bank checks and deposit slips are fed through a bank check sorter device, these checks have pre-printed or punched information read from them (an analytical operation) at one station; have additional information transferred to them at a printing station (a physical operation); and are directed to a particular receiving pocket (another physical operation) at yet another station. Another example of an item transport arrangement is found in the manufacture of certain airplane motors where a rough casting is inserted in the system and is then automatically transported through a number of operating stations for grinding, milling, waxing, etc. The item which started as a rough casting emerges from the automatic manufacturing process as a finished cylinder.

In such item transport arrangements, especially if they are high speed systems, at least two basic monitoring operations are deemed necessary while other monitoring operations may be considered optional in order to insure that the movement of the items is being carried on properly and in order to prevent jams which result in damage to the items.

With regard to the "necessary" monitoring operations, first, the system should recognize when there has been a failure to feed an item into the system. Such a failure in all probability would signify an empty input station (input hopper), or conceivably a jam at the input station. Secondly, the system should recognize when the items are moving at a speed through the item transport path which is substantially different from the rated item speed of the system. Such an irregular transport of items might indicate a jam has occurred or could lead to jams thereby damaging the items. In another instance such impropriety in item transport might signify some type of slipping of the items being transported along the path.

As to the optional category it is often desirable to recognize if any of the items is oversized, and in another instance it is often desirable to know whether or not the items are following one another too closely and are therefore underspaced with respect to one another.

It is an object of the present invention to provide an improved item transport monitoring system.

It is a further object of the present invention to provide an item transport monitoring system which detects the speed of an item between two points along the item transport path.

It is a further object of the present invention to provide an item transport monitoring system which detects when there has been a failure to feed an item into the item insert location of the path.

In accordance with a primary feature of the present invention there is provided a plurality of stations along the path of item transport. At each station the entry and departure of an item can be detected and appropriate signals can be produced therefor.

In accordance with another primary feature of the present invention there is provided a plurality of sets of timing circuits and detecting circuits with each set assigned and coupled to a different one of the stations mentioned above, and with each detecting circuit further coupled to the station subsequent to its assigned station. Each timing circuit delays a signal from its assigned station for a predetermined time which has a relationship to the time that it takes an item moving at a preferred speed to travel from the assigned station to the subsequent station. Each detecting circuit detects if a signal from the subsequent station occurs within the predetermined time and provides a signal if there is a failure of such subsequent station signal occurrence within the predetermined time.

The foregoing and other objects and features of this invention will be best understood by reference to the following description of an embodiment of the invention taken in conjunction with the accompanying drawings, wherein.

Figure 1:
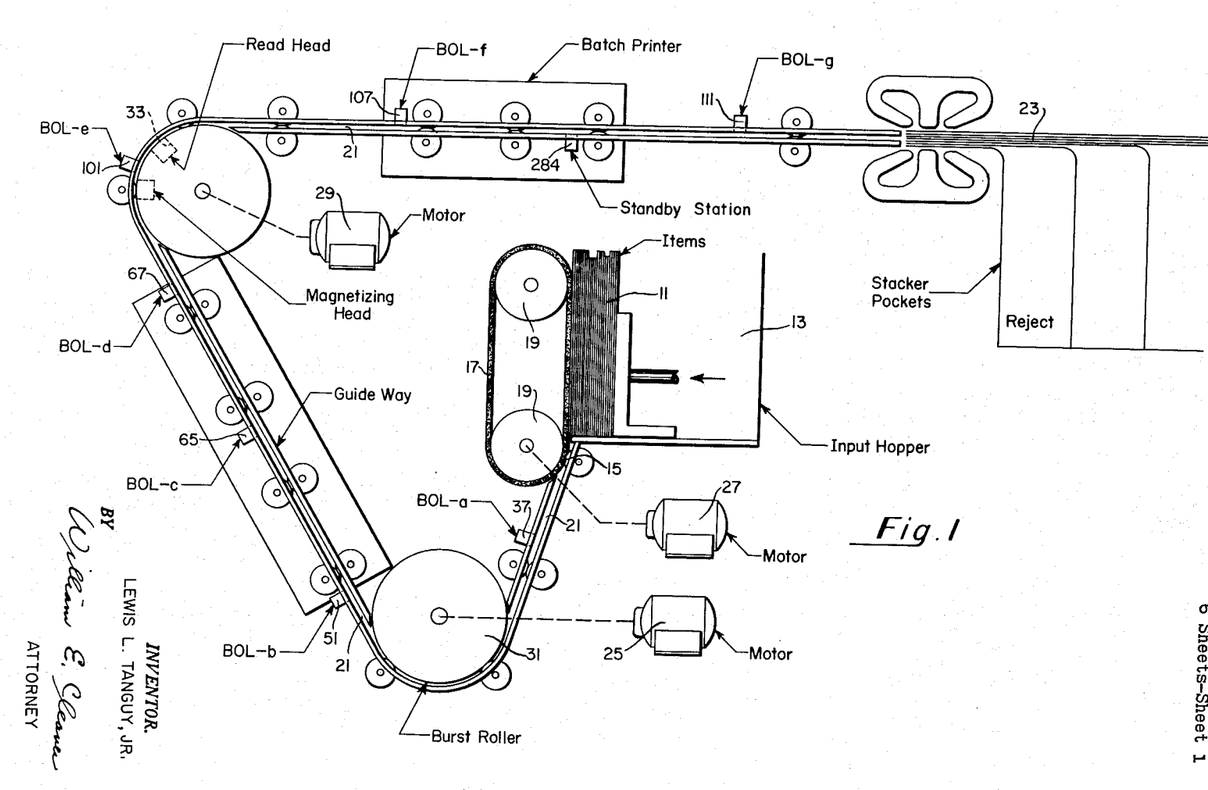
FIG. 1 is a schematic diagram of the item transport path in a bank check sorter system.

In FIG. 1 there is shown a schematic diagram of an item transport system used in a bank check sorting device. The invention will be described in connection with the item transport system of a bank check sorter, but it should be understood that the invention can be used effectively with any item transport arrangement such as those which are employed in automatic manufacturing processes.

Consider first the over-all operation of the bank check sorter as shown in FIG. 1. The items 11, which are checks in our example, are held in a hopper 13 from whence they are fed into the system at the insert point 15 by a friction feed device. As the input belt 17, which is driven by wheels 19 which in turn are driven by motor 27, moves in contact with the checks they are fed, or driven by friction. The novel feeding of checks into this system is described and claimed in the co-pending application entitled "Sheet Stack Advance Mechanism" by Misbin et al., Serial No. 772,552, filed November 7, 1958, now Patent No. 3,032,339, and which is assigned to Burroughs Corporation.

The checks, after leaving the hopper, are moved along the entire transport path 21 to the chute blades 23. In accordance with the information read from each check a chute blade is selected for each check to guide it to the proper stacker pocket. Only a small number of the stacker pockets are shown in FIG. 1. The checks are driven through the entire transport path by a series of drive rollers which are driven by motors 25, 27 and 29.

At various points along the transport path 21 there are found beam-of-light stations (BOL-*a* through BOL-*g*), located to sense the entry and departure of a check, and in response thereto produce appropriate signals. If the checks are detected as travelling improperly, for instance slower than they should be, the monitoring system generates a signal which is transmitted to stop the motors 25, 27 and 29 in order to prevent driving additional items along the path. The system philosophy is that by stopping any further movement of items when an irregular transport condition is detected, possible jam conditions, which normally result from irregular item feeding and movement, will be prevented before they actually happen. Further, if a jam has occurred, the termination of item movement will prevent damage to items which may be driven into the jammed items.

In the bank check sorting system we are herein considering the items leaving the hopper 13 are travelling at a speed of 150 inches per second. Their speed is increased to 400 inches per second when the items come in contact with the burst roller 31, and they continue to travel at 400 inches per second throughout the system. Further, in the bank check sorting system under consideration here certain information found on the checks is read at the read head station 33. The information read at 33 is processed and eventually provides for the selection of the proper one of the chute blades 23. The operation of the reading system and the selection of the chute blades are respectively described and claimed in co-pending U.S. patent applications entitled "Voltage Comparison Circuit" by Shaeffer et al., Serial No. 789,983, filed January 29, 1959, and "Item Handling Apparatus" by Hanstein et al., Serial No. 837,004, filed August 31, 1959, and now abandoned, both of which are assigned to the Burroughs Corporation.

For a better understanding of the invention and the detailed description thereof which is to follow, consider in this regard the general operation of a pair of monitoring stations in connection with an item travelling therebetween. If an item is travelling between two stations at a preferred speed and the distance between the two stations is fixed, and further, if the distance is divided by the speed, the time that the item should take to travel this fixed distance is known or predetermined. The monitoring system of the present invention operates to detect whether or not an item travelling between two stations actually moves from one station to the next within this predetermined time. As will become evident hereinafter, the detection of whether or not the item has arrived at the second station within the predetermined time is accomplished (using the trailing edge signal as a reference) by generating a signal when an item has departed from a first monitoring station, by then delaying this signal for an amount of time which is slightly longer than the time it would take the item to travel between the two stations at the preferred speed, by further generating a signal when the item has departed from the second station, and by finally transmitting the delayed first station signal and the undelayed second station signal to a comparing device. Obviously if the item has not departed from the second station thereby not generating its signal before the delayed signal from the first station (remembering that it has been delayed for more than the amount of time that it should have taken the item to get to the second station) arrives at the comparing device, the comparing device should recognize that the item is travelling slower than the preferred speed.

Figure 2:
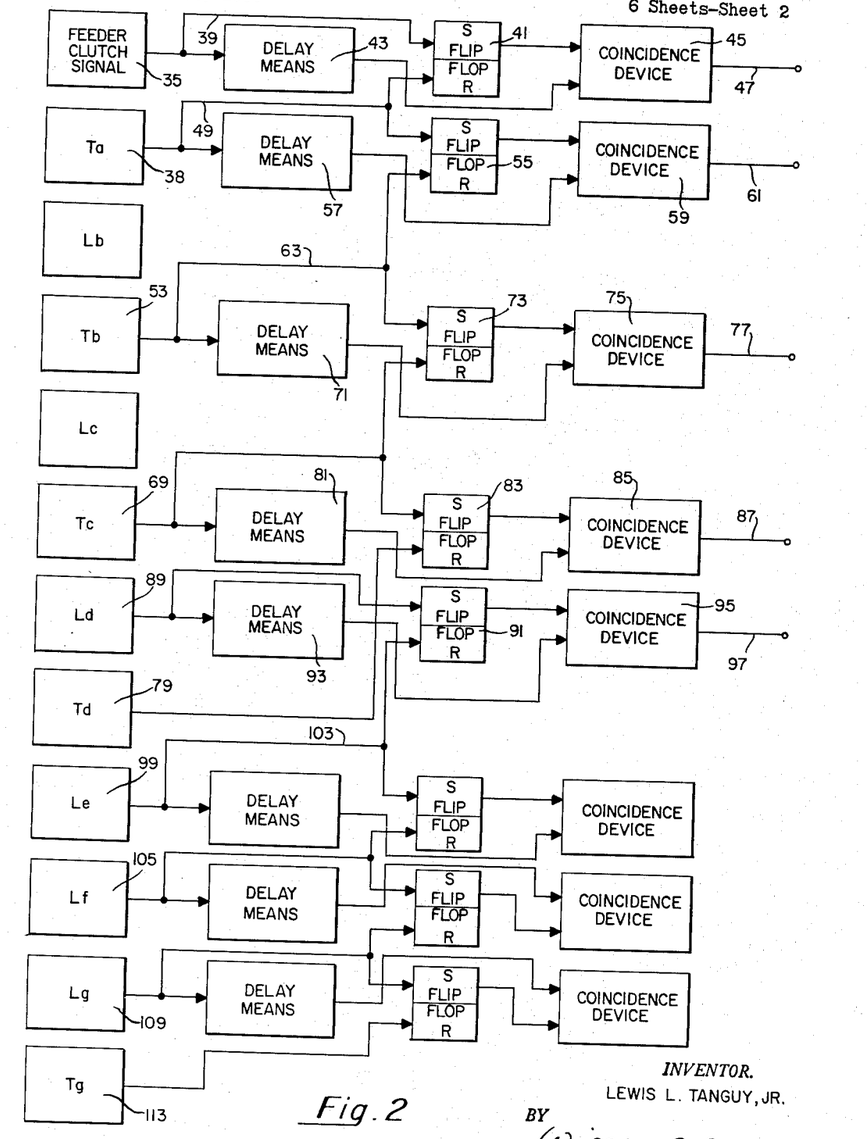
FIG. 2 is a block diagram of the electrical circuitry without circuit details.

For a more detailed study, consider now FIG. 2 in conjunction with FIG. 1. FIG. 2 is a general block diagram of the system. When the system is turned on and the start device activated (either manually or by auxiliary equipment), there is a signal from the feeder clutch signal source 35. Such a feeder clutch signal energizes the feeder clutch (not shown) which in turn engages the motors 25, 27 and 29 of FIG. 1, which in turn drives the input belt 17 and the drive rollers to move the checks from the hopper past the roller 19 and past the BOL–a station 37. When a check departs from the BOL–a station 37 a trailing edge (Ta) signal is generated by signal source 38, FIG. 2.

Initially examine the function of the two signals (the feeder clutch signal and the Ta signal) which have been generated as described above. The feeder clutch signal, which can be considered the first station signal, is transmitted directly by wire 39 to place the flip-flop 41 in its set condition. This signifies that the item has departed from the first station and its departure has been recorded in an interim storage means. This same feeder clutch signal is simultaneously passed through the signal delay means 43. As was suggested earlier, the signal delay means 43 will delay this first station signal for a period of time which is slightly longer than the time it should take for an item moving at the preferred speed (150 inches per second) to travel from the input point 15 to the BOL–a station 37. The coincidence device 45, whose role will become better understood hereinafter, is connected to receive the output signls from flip-flop 41 when it is in its set condition and from the signal delay means 43. The coincidence 45 may be any well-known AND gate, and as is understood in electronic circuit design when a coincidence device is fully conditioned, it provides in response an output signal.

In accordance with the earlier discussion relating to the comparison between a delayed first station signal and an undelayed second station signal to determine whether or not an item is moving between two stations at a preferred speed, we must examine the transmission of the second station signal, Ta. The Ta signal is transmitted directly along line 49 to place flip-flop 41 in its reset condition. The coincidence device 45 and the flip-flop 41 act together to perform the comparison between the delayed feeder clutch signal and the undelayed Ta signal. It becomes evident in FIG. 2 that if the flip-flop 41 is not reset by a Ta signal before the delayed feeder clutch signal reaches the coincidence device 45, there will be an alarm signal produced on line 47 since coincidence device 45 will be fully conditioned by the output signals from flip-flop 41 and the signal delay means 43.

In essence, then, by permitting the Ta signal to erase the stored first station or feeder clutch signal and thereby prevent the coincidence device 45 from becoming fully conditioned or in the alternative by permitting the delayed feeder clutch signal to fully condition the coincidence device 45 if such erasure does not take place, the coincidence device 45 acts with the flip-flop 41 as a comparing means to compare the arrival times between a delayed first station signal and undelayed second station signal. If the delayed first station signal arrives first in time, then the item is recognized as travelling too slowly and an alarm signal is generated.

When this operation is considered in particular with the feeder clutch signal and the Ta signal, we find that if no item is fed into the system or if the item never passes BOL–a station 37 there will be no Ta pulse emanating from source 38 and therefore there will be an alarm signal produced on line 47 indicating that either there has been no item fed or there has been an irregular item transport between the input point 15 and the station 37. We can summarize then that the feeder clutch signal and a trailing edge signal from the BOL–a station 37 operate together in conjunction with the signal delay means 43, flip-flop 41 and coincidence device 45 to detect whether or not an item has been fed into the system and/or whether or not an item is travelling at its rated speed between input point 15 and station 37.

Further, assume that an item has been properly fed and has passed station 37 at its rated speed; has been accelerated by burst roller 31; and has passed the BOL–b station 51. Examining FIG. 2 we find that the trailing edge signal Ta emanating from source 38 works in conjunction with a trailing edge signal Tb emanating from source 53. The Ta signal which passes along line 49 to reset flip-flop 41 simultaneously sets flip-flop 55. This Ta signal in addition is simultaneously passed through the signal delay means 57. The operation is virtually identical to the operation of the feeder clutch signal and the Ta signal described above. In other words, if flip-flop 55 is in its set condition thereby providing an output signal, at the time that there is an output signal from the signal delay means 57, these two output signals will fully condition the coincidence device 59 to generate an alarm signal on line 61. However, such an alarm signal may be prevented if, in fact, the trailing edge pulse from Tb source 53 is transmitted along the line 63 to reset flip-flop 55 before the Ta pulse is transmitted from the delay means 57. This last-described operation differs from the first (feeder clutch signal—Ta signal) described operation only in that the delay of the Ta signal effected by the signal delay means 57 in all probability will be different from the delay of the feeder clutch signal effected by the signal delay means 43. The respective delay times of the signal delay means 43 and 57 will depend upon the distance between the associated BOL stations and the rated speed of the items in transport between the stations. It becomes clear that a Ta pulse from source 38 and a Tb pulse from source 53 work in conjunction with signal delay means 57, flip-flop 55 and coincidence device 59 to detect if an item passing between the BOL–a station 37 and the BOL–b station 51 is travelling at the preferred speed.

As can be seen in FIG. 1, as the items travel along the item transport path 21, past the station 51, they continue to move past the BOL–c station 65 and past the BOL–d station 67. At the BOL–c station 65 there is generated a Tc pulse, and at the BOL–d station 67 there is generated a Td pulse. In FIG. 2 it becomes evident that the Tb pulse from source 53, and the Tc pulse from source 69, operate in conjunction with the signal delay means 71, flip-flop 73 and coincidence device 75 to detect whether or not an item passing between the station 51 and station 65 in FIG. 1 is travelling at its rated speed. The operation of this last-mentioned circuit, which may provide an alarm signal on line 77, is virtually identical to the operation of the circuit described above in connection with the Ta and Tb pulses excepting for a possible difference in the signal delay times.

Similarly the Td pulse from source 79 and the Tc pulse from source 69 operate in conjunction with the signal delay means 81, flip-flop 83 and coincidence device 85 to provide an alarm signal on line 87 when there has been an irregular item transport between stations 65 and 67 of FIG. 1. The delay means 71 and 81 are designed to delay the respective input signals thereto in accordance with the rated speed of the items, and the distance between the stations whose signals these respective delay means are assigned to handle.

For design reasons the bank check sorter with which the present invention is described, switched from a trailing edge reference to a leading edge reference at station BOL–c. It is to be understood at this point that the system could operate entirely with a trailing edge reference or entirely with a leading edge reference, or any combination of intermixed references as may suit the needs of the system. At the BOL–d station 67 there is generated an Ld pulse which is so labeled in order to designate a leading edge pulse generated at the BOL–d station 67. The Ld pulse from source 89 in FIG. 2 is directly transmitted to set flip-flop 91 and simultaneously transmitted through the signal delay means 93. As was described in connection with the circuits above, if the flip-flop 91 is in its set condition providing an output therefrom, at the time that there is an output signal from the signal delay means 93, these two output signals will fully condition the coincidence device 95 to produce an alarm output signal on line 97. The alarm signal on line 97 can be prevented if, in fact, the Le pulse from source 99 (from BOL–e station 101 in FIG. 1) is transmitted via line 103 to reset flop-flop 91 prior in time or before there is an output signal from the signal delay means 93.

A further examination of FIG. 2 readily reveals that the BOL–e pulse from source 99 works in combination with the BOL–f pulse from source 105 to monitor the item transport between the BOL–e station 101 and BOL–f station 107 in FIG. 1. It is also evident in FIG. 2 that the Lf pulse from source 105 works in combination with the Lg pulse from source 109 to monitor the item transport between the BOL–f station 107 and BOL–g station 111 in FIG. 1. It is further evident that the Lg pulse from source 109 works in combination with Tg pulse from source 113 to monitor the transport of an item through the station BOL–g.

Throughout the description there has been and will be reference made repeatedly to an AND gate and to an OR gate. The ground rule to be followed in understanding the present description, in view of the particular AND gates and OR gates used, is in essence: each AND gate requires positive input signals simultaneously applied to each of its input leads to fully condition the AND gate which in response provides a negative voltage output. When an AND gate is not fully conditioned it is providing a positive voltage output. Each OR gate requires that at least one of its input lines be conditioned negative to provide a positive output signal. When none of the input leads to an OR gate is negative its output is negative.

Such an electronic gating device is described in the co-pending application entitled "Switching Networks," by oward E. Tompkins, Serial No. 612,848, filed September 28, 1956. It should be understood, however, that other types of AND and OR gates may be used provided the auxiliary circuitry used therewith is correctly provided.

With respect to the references to flip-flops throughout the present description it is to be understood that a flip-flop herein may be any wellknown bistable multivibrator. When a flip-flop has been placed (set or reset) in a particular condition the flip-flop will provide a positive voltage output from the terminal corresponding to that condition while providing a negative voltage output signal from the terminal corresponding to the other condition.

Figure 3A:
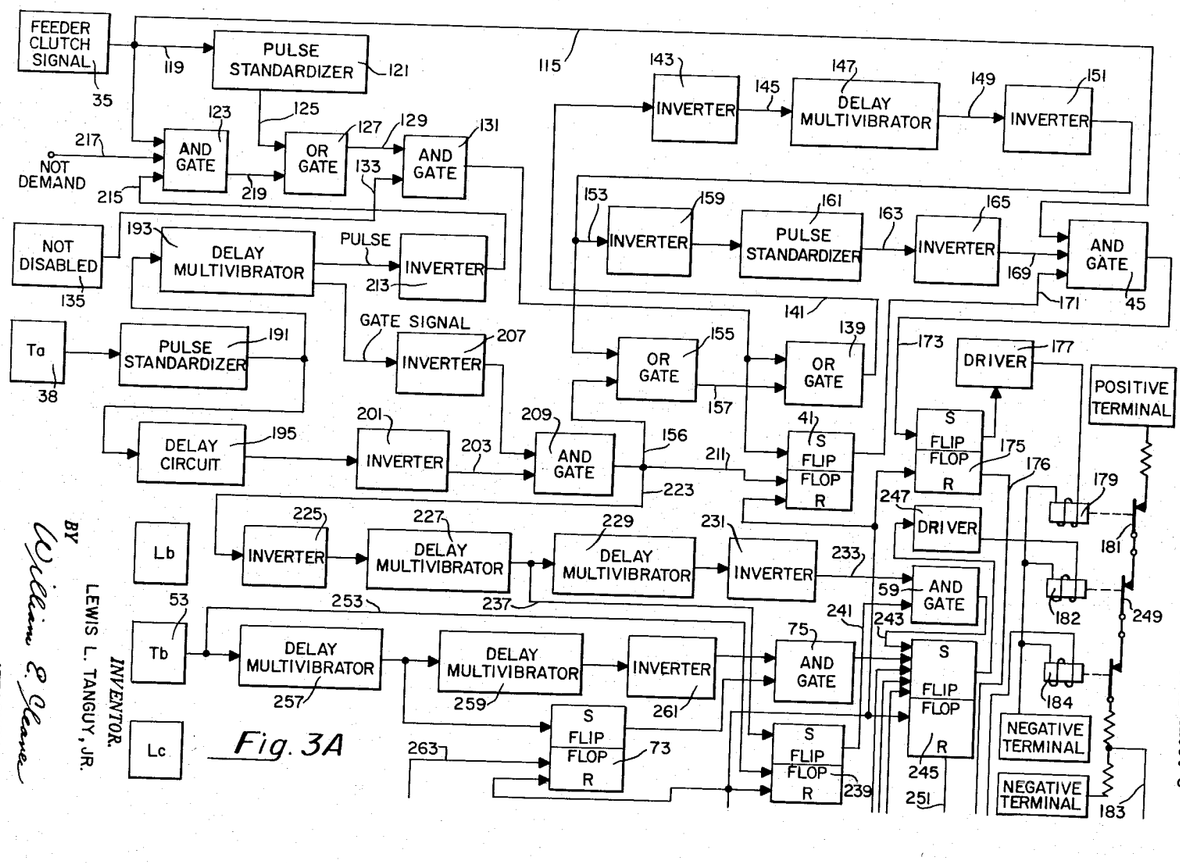
FIGS. 3a and 3b together represent a block diagram of the system in detail.
Figure 3B:
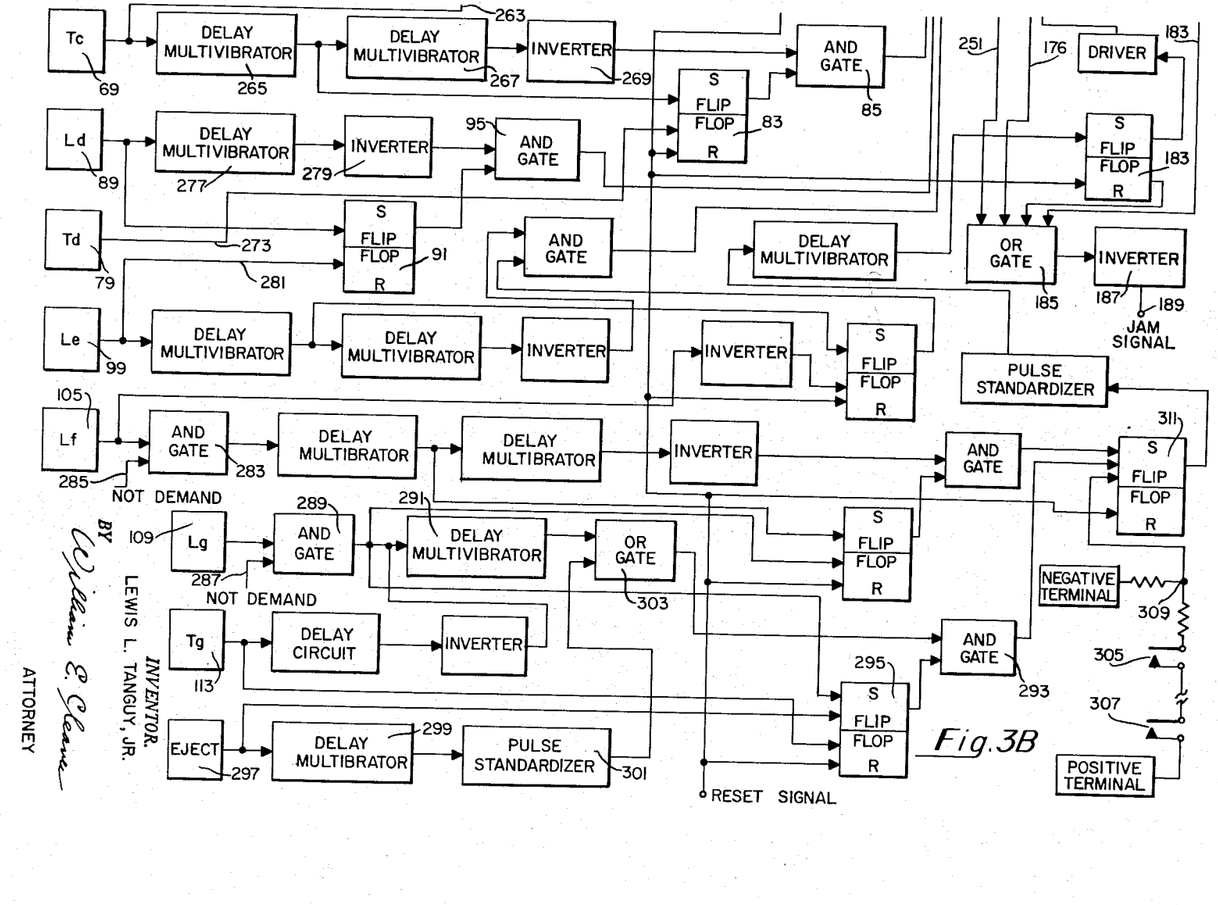

FIG. 3 shows a detailed block diagram of the monitoring system not including optional equipment. When the system is turned on all of the flip-flops are placed in their respective reset conditions. The feeder clutch signal source 35 provides a signal with which the feed mechanism is started. This feeder clutch signal is transmitted along three paths, first along the line 115 to the AND gate 45; second, along the line 119 to the pulse standardizer 121; and third, directly to AND gate 123.

Figure 4A:
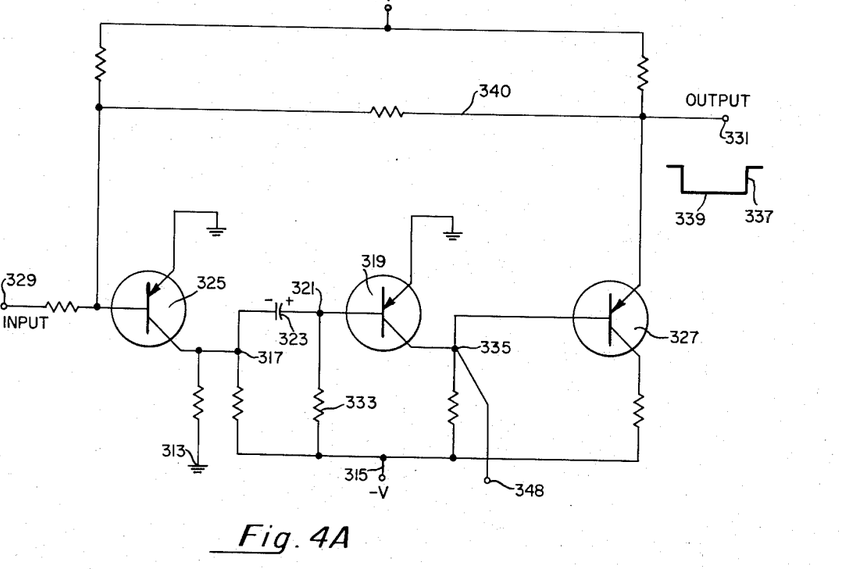
FIGS. 4a and 4b are schematic diagrams of delay multivibrator circuits.
Figure 4B:
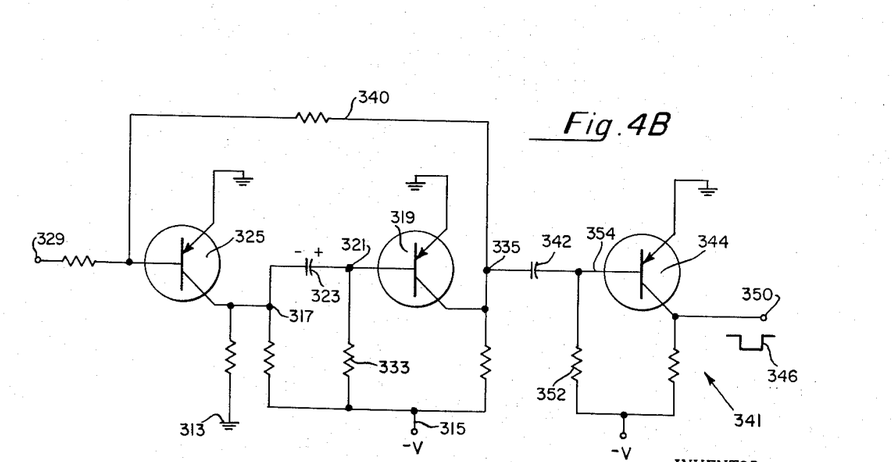

The feeder clutch signal is a D.C. signal, or a constant voltage condition as contrasted by comparison with a pulse type signal. First consider the application of the feeder clutch signal to the pulse standardizer 121. The pulse standardizer circuit may be any well-known R-C circuit which responds to an initial voltage shift and provides a standard pulse in response thereto. A specific example of a pulse standardizer is described hereinafter in connection with FIG. 4. When the feeder clutch signal is applied to pulse standardizer 121 there is transmitted therefrom a negative pulse signal on line 125 to the OR gate 127.

According to the ground rule previously stated, OR gate 127 accepts the negative pulse on line 125 and transmits a positive pulse on line 129 to the AND gate 131. Connected to AND gate 131 by line 133 is a "not disabled feeder" signal source 135. Optional equipment or auxiliary equipment, not shown in FIG. 3, may provide a negative signal on line 133 when it is necessary to temporarily terminate a recirculation of a Ta signal. For instance, optional equipment described and claimed in co-pending application entitled "Monitoring System" by John Pedersen, filed December 24, 1959, Serial No. 861,828, now U.S. Patent No. 3,046,538, will detect when two items are underspaced or an item is overlength. Such an underspaced condition will give rise to a "disabled feeder" signal, or negative signal, from source 135 on line 133 to AND gate 131. If there is no condition warranting the "disabled feeder" signal a positive voltage will appear on line 133. This last-mentioned positive voltage condition, in conjunction with the previously mentioned positive voltage pulse on line 129, fully conditions AND gate 131 to provide a negative output pulse therefrom.

The negative pulse from the AND gate 131 is transmitted to set flip-flop 41 and is simultaneously transmitted to OR gate 139. In response to this negative pulse at OR gate 139 there is provided a positive output on line 141 which is inverted by inverter 143 to become a negative input signal on line 145 to the delay multivibrator 147. As will be more fully explained hereinafter in connection with FIG. 4 the delay multivibrator is basically a monostable multivibrator which responds to a negative pulse and provides a negative voltage output for a predetermined time thereafter, and a positive voltage shift at the end of this predetermined time. The predetermined time for the delay multivibrator is slightly longer than the time it should take an item which is travelling at the preferred speed to travel from the input point through BOL-$a$ station 37. The negative voltage condition appearing on line 149 for the predetermined time is inverted at inverter 151 to provide a positive voltage condition on line 153 for the predetermined time. The positive voltage condition on line 153 is fed back to the OR gate 155 causing this OR gate to transmit a negative voltage condition on line 157 for the delay time of the multivibrator 147. Although the gate 155 is labeled an OR gate, it is interesting to note that since line 156 must stand by high for this last-described feed back to occur, gate 155 can be considered an AND gate in this operation. The negative voltage condition on line 157 conditions the OR gate 139 to provide a positive voltage condition on line 141 which again is inverted by inverter 143 to provide a negative input voltage on line 145. At the end of the predetermined time (delay time of multivibrator 147) there will be transmitted on line 149 a positive voltage shift which by virtue of the feedback loop just described will terminate the negative input signal on line 145.

This positive voltage shift being inverted at inverter 151 becomes a negative signal, and being again inverted at inverter 159 becomes a positive signal which is transmitted to the pulse standardizer 161. The pulse standardizer 161 responds to a positive voltage shift to provide a negative output pulse on line 163 which is inverted by inverter 165 to provide a positive input pulse on line 169 to the AND gate 45. It should be recalled at this point that flip-flop 41 was placed in its set condition which provides a positive voltage condition on the input line 171 to AND gate 45 and that the positive feeder clutch signal was directly transmitted by line 115 to the AND gate 45. The three positive voltage conditions at the input lines of AND gate 45 render that AND gate fully conditioned, thereby providing a negative pulse signal on line 173 to set flip-flop 175. The pulse on line 173 has a duration of the pulse on line 169.

When flip-flop 175 is placed in its set condition the negative level from its reset terminal is transmitted along line 176 through the OR gate 185 to the inverter 187 to initiate a jam signal at terminal 189. Simultaneously the signal from the set terminal of flip-flop 175 through the driver 177 energizes the latching relay 179 to open the relay contact points 181. Relay 179, along with relays 182 and 184, is a latching-type relay to provide a sustained jam memory if the power is turned OFF before having cleared a jam and the power is subsequently turned on again. When the relay contacts 181 are opened a negative signal is transmitted on line 183 through the OR gate 185 through the inverter 187 to aid in providing a jam signal at terminal 189. The jam signal in the bank check sorter system is used to terminate the motor operation but this signal can be used to merely warn the operator by virtue of a light or a buzzer. Obviously, and in accordance with our discussion in connection with FIG. 2, it would not be desirable to provide a jam signal every time the feeder clutch was energized. Consider then the operation of the $Ta$ pulse from source 38 which prevents the jam signal from being generated if in fact items are progressing along the item transport at their rated speed.

When an item has passed through the BOL-$a$ station 37 in FIG. 1, there is provided a positive $Ta$ pulse from source 38 in FIG. 3. The inhibiting role of a $Ta$ pulse is predicated on an acceptable $Ta$ signal being generated at BOL-$a$ station 37. In the particular system under consideration it was felt that there should be some assurance that a "good" $Ta$ pulse had been generated. There are some conditions present in the feeding operation which might impede the provision of a "good" $Ta$ pulse, although these possibilities have empirically been found to be remote.

The $Ta$ signal from source 38 is transmitted to the pulse standardizer 191, which in turn provides a negative output pulse to the delay multivibrator 193 and simultaneously to the delay circuit 195. The delay multivibrator 193 responds to a negative pulse of a predetermined amplitude and provides a negative output signal therefrom (labelled gate) for a predetermined time. If the delay multivibrator 193 is not responsive to a $Ta$ pulse there will be provided a positive voltage output signal therefrom.

Assume that there is a $Ta$ pulse of sufficient amplitude to activate the delay circuit 195 but not of sufficient amplitude to activate the delay multivibrator 193. The weak $Ta$ pulse would be transmitted through the delay line 195 to be inverted at the inverter 201 and would provide a positive voltage signal on input line 203 to AND gate 209. Since delay multivibrator 193 was not responsive there would be a positive signal therefrom which when inverted at inverter 207 would provide a negative signal at AND gate 209. The negative signal would not permit AND gate 209 to provide an output to reset flip-flop 41. Therefore the output from the set side of flip-flop 41 would set flip-flop 175, and as described before, provide a jam signal.

Now consider what happens when there is provided an acceptable $Ta$ pulse from the pulse standardizer 191. In response to this acceptable $Ta$ pulse the multivibrator 193 provides a negative voltage output signal for a predetermined time. The negative pulse from delay multivibrator 193, after being inverted at inverter 207 renders (along with the previously described positive signal from inverter 201), the AND gate 209 fully conditioned. The negative output from AND gate 209 is transmitted along line 211 to reset flip-flop 41. It will be recalled that the positive voltage signal from the flip-flop 41, being in its set condition, was necessary in order to render AND gate 45 fully conditioned, and the output from AND gate 45 in turn through flip-flop 175, driver 177, energized relay 179 to open contacts 181 as described above, thereby providing a jam signal on line 183. In other words, when flip-flop 41 is reset the AND gate 45 is prevented from being fully conditioned. Therefore, if the delayed pulse which eventually appears on line 169, which is an input line to AND gate 45, arrives after $Ta$ and attempts to fully condition this AND gate, this attempt will be in vain. This operation, while more detailed, is identical to the operation discussed in connection with FIG. 2, and particularly in connection with flip-flop 41 and coincidence device 45.

It will be recalled that the feeder clutch signal from source 35 is a constant voltage signal or D.C. signal. The comparison between stations is based on a comparison of properly timed pulses and therefore it is desirable to develop pulse-type signals from the feeder clutch signal, or provide pulses controlled by the feeder clutch signal, if there is to be a comparison between a feeder clutch signal and a $Ta$ pulse from source 38. As was explained before, a pulse-type signal is generated at the pulse standardizer 121 in response to the positive change of voltage at the input when the operation is initially started. Thereafter this pulse is directed through the circuitry as described earlier in order to provide a comparison (in time) with a T*a* pulse. The D.C. signal from source 35, when the system is operating "free flow" as compared with "demand," does not provide a pulse for each item subsequent to the first for comparison, and in order to do so, a T*a* pulse is circuitry-routed (recirculated) and controlled by the feeder clutch signal to provide a pulse representing an item in transport at the item input station.

When the T*a* pulse is generated at source 38 it is transmitted through the pulse standardizer 191 to delay multivibrator 193. The output from delay multivibrator 193 is transmitted along two paths, one of which has been previously described, i.e., to inverter 207. The negative output signal from the delay multivibrator 193 is transmitted along the second path to inverter 213 where it becomes a positive pulse. This positive pulse from inverter 213 is then transmitted along the line 215 to AND gate 123. For the purpose of explanation at this point, consider that there is a positive voltage on the "not demand" line 217. These three positive signals, i.e., the feeder clutch signal, the "not demand" signal and the output from inverter 213 fully condition the AND gate 123 to provide a negative signal on line 219. The negative signal on line 219 conditions the OR gate 127 to provide a positive delayed (T*a*) output on line 129 to serve as an operative substitute for the feeder clutch signal.

The positive pulse on line 129 along with the positive D.C. level on line 133 fully conditions the AND gate 131 to provide an output pulse which performs the same role as did the output pulse from the pulse standardizer 121, as previously described. If the feeder clutch signal is not supplied to the AND gate 123 the T*a* pulse will not be transmitted therethrough. Such a feeder clutch signal control arrangement effectively provides a pulse from the item insert point to be used for comparison with a T*a* pulse subsequently generated.

In summation, thus far we have examined the generation of a pulse when the system is turned ON by virtue of the feeder clutch signal 35 to the pulse standardizer 121; a comparison (in time) of this initial pulse with a subsequent station pulse from station BOL–*a* to detect whether or not items are being properly transported between the insert point and the BOL–*a* station; the generation of a jam signal if this last-mentioned comparison fails to find T*a* occurring prior in time to the delayed initial pulse; and a recirculation of the (T*a*) pulse to provide a pulse representation for an item subsequently being transported into the insert station.

To carry on further, and in accordance with the previous discussion of FIG. 2, we know that the T*a* pulse from source 38 will be compared with the T*b* pulse from source 53. The T*a* pulse from source 38, after it leaves the AND gate 209, is transmitted along line 223 to inverter 225 to provide a positive pulse from inverter 225 which is transmitted to the delay multivibrator 227. The output from delay multivibrator 227 is transmitted along two paths, the first of which is to the delay multivibrator 229. The output from the delay mulitvibrator 229 is inverted at inverter 231 and transmitted on line 233 to the AND gate 59. The second path along which the output from delay multivibrator 227 is passed is along line 237 to set flip-flop 239. The output from the set condition terminal of flip-flop 239 is transmitted via line 241 to fully condition (along with the signal on line 233) and AND gate 59. When the AND gate 59 has been fully conditioned its output signal is transmitted along line 243 to set flip-flop 245, and the output therefrom through the driver 247 energizes relay 182. The negative signal on line 251 from the reset terminal of flip-flop 245 to the OR gate 185 immediately initiates a jam signal. When the relay 182 is energized the relay contacts 249 are opened and a sustained jam signal is supplied, as described earlier.

The generation of this last-described jam signal is prevented if the T*b* pulse from source 53, transmitted along line 253, resets flip-flop 239 before the delayed T*a* pulse on line 233 is applied to AND gate 59. This operation has been described above in connection with FIG. 2, and especially in the description of the operation of flip-flop 55 and coincidence device 59.

The signal delay means 227 and 229 are split as shown in order to provide a storage for a subsequent item in the delay multivibrator 227 while in fact the system is operating or comparing a delayed signal from a previous item being transmitted from delay multivibrator 229.

The signal from T*b* source 53 operates in conjunction with the T*c* signal from source 69 in a fashion virtually identical to the operation between the T*a* and T*b* pulse just described. In other words, a T*b* pulse passing through delay multivibrator 257 and delay multivibrator 259 and inverter 261 attempts to fully condition the AND gate 75 before a T*c* pulse from source 69 transmitted along line 263 resets flip-flop 73. Similarly a T*c* pulse from source 69 is transmitted through delay multivibrator 265, the delay multivibrator 267 and the inverter 269 and attempts to fully condition the AND gate 85 before a T*d* pulse from source 79 transmitted along line 273 resets the flip-flop 83. The output signals from a comparison between the T*b* and the T*c* pulse, and a comparison between the T*c* pulse with the T*d* pulse, are transmitted to set flip-flop 245 and the jam signal which ensues is as described before.

As was suggested earlier, in the bank sorter system which we are considering here, it was desirable for design purposes to switch to a leading edge reference at the BOL–*d* station. The leading edge signal L*d* from source 89 is transmitted through the delay multivibrator 277, the inverter 279 in an attempt to fully condition the AND gate 95 before the leading edge pulse L*e* from source 99 is transmitted on line 281 to reset the flip-flop 91. Similarly a leading edge signal L*f* from source 105 is compared with a delayed leading edge signal L*e* from source 99, and the leading edge signal L*g* from source 109 is compared with the delayed L*f* signal from source 105. When the item is passed through the last station, the BOL–*g* station, the system is slightly varied. Since there is no advanced station with which a signal from this station could be compared, the item is merely monitored by comparing its leading edge pulse with its trailing edge pulse. This can be seen by considering that an L*g* pulse from source 109 is delayed by the delay multivibrator 291 which subsequently attempts to fully condition the AND gate 293 before the T*g* pulse from source 113 resets flip-flop 295.

In connection with the comparison between the L*f* pulse and the L*g* pulse there is also a slightly varied arrangement. The L*f* pulse from source 105 is initially transmitted to the AND gate 283 whose other input line is connected to a "not demand" signal. It will be noted that the BOL–*f* station as seen in FIG. 1 is near the end of the transport path or near the entry to the chute blades. In one of the operations with which the bank sorter system is used, it is possible to pass a single item through the system. When this happens the status is considered as "demand." In a "demand" operation the item is transported to a stand-by station 284 whereat the item is stopped. At some later time the item is transported from the stand-by station to the chute blades 23. So long as the status is "not demand" or is a "free flow" of items, there is provided a positive signal on line 285 and line 287. If in fact a single item is being processed a "demand" signal or a negative signal will appear on line 285 and line 287 respectively, disenabling gates 283 and 289.

The philosophy for this arrangement is twofold. First, if the item is stopped at the stand-by station which is after the L*f* signal has been generated but before an L*g* signal has been generated, there would be a false "alarm" signal produced. The L*g* signal under these circumstances would not be available to inhibit the L*f* pulse and hence the L*f* pulse would cause an alarm signal. Therefore in the "demand" mode, since the item is stopped at the stand-by station, the L*f* signal is prevented from being transmitted through the AND gate 283 by the application of a negative "demand" signal to AND gate 283. Secondly, in the "demand" mode when the item is ejected from the stand-by station it's leading edge signal Lg would find no leading edge signal Lf to be compared against since the Lf signal would have been inhibited at gate 283 as just described. Therefore, the Lg signal is also inhibited at gate 289 by a negative signal on line 287.

There is further included in FIG. 3 an eject pulse at source 297, which pulse is delayed at multivibrator 299, transmitted through the pulse standardizer 301, passed through the OR gate 303, to attempt to fully condition the AND gate 293. This attempt by the eject pulse to fully condition the AND gate 293 may be prevented by a Tg pulse from 113 resetting the flip-flop 295. The eject pulse is somewhat analogous to the feeder clutch signal. An eject pulse is applied when an item is to be transported from the stand-by station. The initiation of the eject signal is compared against the Tg pulse as just described.

There are further shown in FIG. 3 two mechanical switches 305, 307. Actually in the system there are many such switches conveniently located to monitor the speed of the roller mechanisms such as the burst roller 31 shown in FIG. 1 and rollers not shown which lie beyond the chute blades entry. When the rollers are at rated speed, each of the pairs of switch contacts 305, 307, etc. are closed so that the voltage appearing at junction point 309 is relatively positive, thereby not providing a signal to cause the flip-flop 311 to be set. In the copending U.S. application entitled "Item Handling Apparatus" by F. V. Palasciano, Serial No. 816,005, filed May 26, 1959, now Patent 3,022,907 and assigned to Burroughs Corporation, such mechanical switching means are described and claimed.

Consider now FIGS. 4a and 4b which are schematic diagrams of different arrangements of delay multivibrators, versions of which are used throughout the system. When the delay multivibrator in FIG. 4a is in its quiescent state there is current flow from the ground terminal 313 to the negative voltage terminal 315. This provides a relatively negative potential at point 317. Simultaneously the transistor 319 is conducting and the junction point 321 is at a potential slightly less than ground. The potentials at 317 and 321 provide an initial charge across the capacitor 323 as shown by the symbols. With the transistor 319 conducting, point 335 is slightly less than ground and therefore transistor 327 is conducting. In the quiescent state transistor 325 is not conducting.

When there is a negative voltage applied to terminal 329, the transistor 325 commences to conduct, causing the potential of point 317 to become closer to ground. The positive voltage developed across the capacitor 323 is now measured from a voltage level closer to ground at point 317 thereby cutting off the transistor 319. When the transistor 319 is cut off, the transistor 327 commences to conduct more heavily, providing a relatively negative output at terminal 331. The transistor 319 will remain cut off until the capacitor 323 discharges to a point where the potential of the base of transistor 319 is at ground or slightly below ground. The time needed for such a discharge is dependent upon the RC time constant as determined by the capacitor 323 and the resistor 333. There is a feedback operation involved by virtue of the feedback circuit 340 which provides regenerative action at transistor 325. When the capacitor 323 is sufficiently discharged, the transistor 319 will commence conducting, raising the potential of the point 335 substantially close to ground level, thus reducing the conduction of transistor 327. When the transistor 327 is conducting, as in its quiescent state, there is seen at the output terminal 331 a positive voltage shift thereby providing the lagging edge of the negative pulse.

The standard negative gate signal provided at the output terminal 331 is used in various ways. By using the trailing edge or the positive voltage shift 337, the circuit can be considered as a signal delay device whose delay is measured by the duration of the negative gate signal 339. If this gate signal is to be terminated early, this may be done by applying a positive signal to terminal 343.

The delay multivibrator of FIG. 4b is an arrangement to provide a pulse output. The circuit operates as did the circuit of 4a excepting that emitter follower transistor 327 is not present. Instead a pulse standardizer circuit 341 is connected to point 335. When transistor 319 is cut off, during the gate time, the condenser 324 discharges. When the transistor 319 commences conducting, the condenser 342 commences charging and during its charging time the transistor 344 is turned off (until base 354 becomes sufficiently negative to turn on transistor 344) thereby providing the pulse 346 at output terminal 350.

Throughout the system there is frequent reference made to a pulse standardizer identified in FIG. 4b as the circuit 341. The time to charge the condenser 342 is dependent upon the RC time constant as determined by the capacitor 342 and the resistor 352. The time necessary to charge the condenser 342 is relatively short and hence there is a pulse type output 346 appearing at terminal 350.

Figures 5A, 5B, 6:
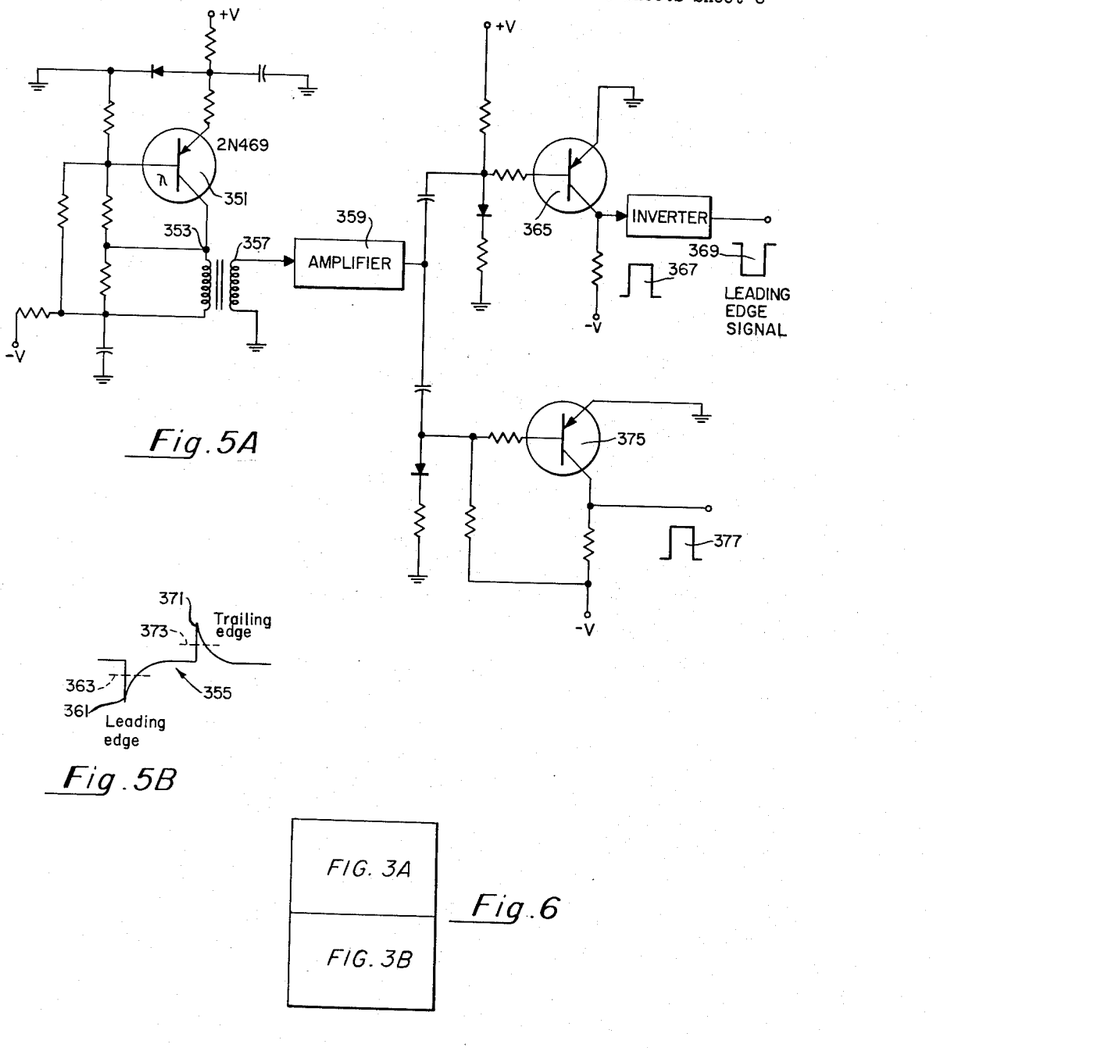
FIGS. 5a and 5b are respectively a schematic diagram of a beam-of-light circuit and a waveform of a signal.
FIG. 6 shows the relationship of FIGS. 3a and 3b to each other.

In FIG. 5 there is shown a schematic of a beam-of-light circuit. The photosensitive transistor 351 responds to light striking its base element. Obviously the transistor can be replaced by some other form of photosensitive device. When a leading edge of a check crosses the beam of light the photosensitive transistor 351 conducts less and the point 353 experiences a negative voltage shift, while when the check has travelled through the station and the beam of light again impinges on transistor 351 causing it to conduct more, the point 353 experiences a positive voltage shift. Waveform 355 shows the leading and trailing edge voltage shifts as they appear on the secondary winding 357 of the transformer. These two signals are amplified at the amplifier 359.

Consider the leading edge voltage shift 361 of waveform 355. If this signal becomes more negative than the level 363 the transistor 365 conducts and goes to saturation providing an amplified leading edge signal 367 which may be inverted to appear as an amplified leading edge signal 369 if the operation requires it. If the trailing edge voltage shift 371 becomes more positive than level 373 the transistor 375 becomes cut off to provide the amplified trailing edge signal 377.

With a preferred embodiment of the present invention described above the signal delay means delayed a signal for a period of time slightly longer than the time that it would take for an item travelling at a preferred speed to move from one station to the next. Such a delay time was chosen because of the particular monitoring duties of the system related to checking that an item was travelling at the preferred speed. The present invention could be adapted to be used with a system where the monitoring duties are to check that the items are not travelling faster than the rated speed, in which case the signal delay means would delay the signals for less than the time it would take an item to travel between two stations at a preferred speed. The present invention might also be adapted to provide a tolerable period in which an item should arrive at a second station after having been observed at the first station. In this last-mentioned application the signal delay means would delay the signal for a shorter period of time than the time it would take an item to travel from one station to the next at the preferred speed. The output of the delay means would be connected to trigger a monostable multivibrator or some equivalent device to provide a gating signal. The gating signal would start before the item should arrive and end after it should have arrived. If in fact the item arrived before the gating signal started, or after it ended, the item would be considered to be respectively travelling too fast or too slowly.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A monitoring system for use with items in transport along an item transport path comprising, first monitor signal source means located at a first station along said item transport path to produce a first monitor signal when an item has been transported within said first station, second monitor signal source means located at a second station along said item transport path to produce a second monitor signal when an item has been transported within said second station, signal delay means connected to said first monitor signal source to receive said first monitor signal and delay said first monitor signal for a predetermined time, signal detecting means connected to receive said delayed first monitor signal and to receive said second monitor signal to detect which one of said signals has been received prior in time, said signal detecting means including a bistable device and a coincidence device, said bistable device having a first state input adapted to receive said first monitor signal, a second state input adapted to receive said second monitor signal and a first state output, said coincidence device adapted to receive said delayed first monitor signal and said first state output of said bistable device to provide and output whenever said delayed first monitor signal occurs prior to said second monitor signal and utility means connected to said signal detecting means and responsive to the output of said coincidence device.

2. A monitoring system for use with items in transport along an item transport path comprising, first monitor signal source means located at a first station along said item transport path to produce a first monitor signal when an item has been transported within said first station, second monitor signal source means located at a second station along said item transport path to produce a second monitor signal when an item has been transported within said second station, signal delay means connected to said first monitor signal source to receive said first monitor signal and delay said first monitor signal for a predetermined time, said predetermined time being related to the rated speed of said item in transport and the distance between said first and second station, a bistable device having a first state input adapted to receive said first monitor signal, a second state input adapted to receive said second monitor signal and a first state output, a coincidence detecting device coupled to said first state output of said bistable device and adapted to receive said delayed first monitor signal for providing an output signal whenever said delayed first monitor signal occurs prior to said second monitor signal.

3. A monitoring system for use with items in transport along an item transport path according to claim 2 wherein said signal delay means delays a signal for a period of time that is related to the quotient of the distance between said first and second station divided by the speed of said item in transport travelling therebetween.

4. A monitoring system for use with items in transport along an item transport path comprising, first monitor signal source means located at a first station along said item transport path to produce a first monitor signal when an item has been transported within said first station, second monitor signal source means located at a second station along said item transport path to produce a second monitor signal when an item has been transported within said second station, signal delay means connected to said first monitor signal source to receive said first monitor signal and delay said first monitor signal for a predetermined time, said predetermined time related to the rated speed of said item in transport and the distance between said first and second station, signal detecting means connected to receive said delayed first monitor signal and to receive said second monitor signal to detect which one of said signals has been received prior in time, bistable means connected to said detecting means to be transferred to its first state if said first monitor signal has been received by said detecting means prior in time, a signal sustaining means connected to receive an output signal from the first state of said bistable means to be responsive thereto and provide a sustained signal in the event said bistable means should be erroneously altered.

5. A monitoring system for use along an item transport path comprising, item transport means including an item transport path and means for causing items to travel the length of said item transport path, feeder monitor signal source means operative in conjunction with said item transport means to provide feeder monitor signals when said transport means operates to feed items into said transport path at an item input station, feeder monitor signal delay means connected to receive said feeder monitor signals and respectively delay each of said feeder monitor signals for a predetermined time, said predetermined time related to the rated speed at which items are transported along said transport path, first monitor signal source means located at a first monitoring station to produce first monitor signals as each item is transported within said first monitoring station, a bistable device having a first state input adapted to receive said feeder monitor signal a second state input adapted to receive said first monitor signal and having a first state output, a coincidence detecting device coupled to said first state output of said bistable device and adapted to receive said delayed feeder monitor signal for providing an output signal whenever said delayed feeder monitor signal occurs prior to said first monitor signal, and utility means coupled to said coincidence device and responsive to the output signal of said coincidence device.

6. A monitoring system for use along an item transport path according to claim 5 wherein there is further included signal control means connected to said feeder monitor signal source to be responsive to a single item transported through said transport path to inhibit a second of said feeder monitor signals from being generated even through said item transport means is operative.

7. A monitor system for use along an item transport path according to claim 5 wherein there are further included electromechanical switching means which are responsive to the operation of said item transport means, said switching means completing an electrical circuit path in response to said transport means operating at its rated speed and opening said electrical circuit path in response to said transport means operating below its rated speed, and alarm signal means connected through said electrical circuit path to provide an alarm signal when said path is opened.

8. A monitoring system for use with items in transport along an item transport path comprising, first monitor signal source means located at a first station along said item transport path to produce a first monitor signal when an item has been transported within said first station, second monitor signal source means located at a second station along said item transport path to produce a second monitor signal when an item has been transported within said second station, first and second signal delay means to provide a temporary signal storage means for signals from a subsequent item at said first signal delay means while said monitoring system is operating on a signal from a prior item which signal is passing along said second signal delay means, said first signal delay means connected to receive and delay said first monitor signal for a first predetermined time, said second signal delay means connected to receive and delay said delayed first monitor signal for a second predetermined time, each of said first and second predetermined times being related to the rated speed of said items transport, signal detecting means connected to receive said first monitor signal (1) from said first signal delay means and (2) from said second signal delay means, said signal detecting means being further connected to receive said second monitor signal to detect if said first monitor signal from said second signal delay means is received prior in time, and utility means coupled to said signal detecting means to be responsive if said first monitor signal from said second signal delay means has been received by said detecting means prior in time.

9. A monitoring system for use along an item transport path comprising, feed mechanism signal source means operative in conjunction with item transport means to provide a feed mechanism signal when said transport means operates to feed items into said transport path at an item input station, pulse generating means coupled to receive said feed mechanism signal and generate an initial feeder monitor signal in response to starting said transport means, first monitor signal source means located at a first monitor station along said path to produce first monitor signals as each item is transported within said first monitoring station, signal control means connected to receive said feed mechanism signal and be controlled thereby, signal recirculating circuitry coupled to receive said first monitor signals and recirculate them to said signal control means, said control means passing said recirculated first monitor signals when said feed mechanism signal is applied thereto to provide feeder monitor signals therefrom, feeder monitor signal delay means connected to receive said feeder monitor signals and respectively delay each of said feeder monitor signals for a predetermined time, said predetermined time related to the rated speed at which items are transported along said transport path, signal detecting means connected to receive said delayed feeder monitor signals and said first monitor signals, said signal detecting means to detect with respect to an associated first monitor signal and feeder monitor signal whether said first monitor signal is received prior in time to said delayed feeder monitor signal, and utility means coupled to said signal detecting means to be responsive if said first monitor signal has been received by said detecting means second in time.

10. A monitoring system according to claim 9 wherein there is further included second control means coupled to said signal control means to temporarily terminate the recirculation of said first monitor signals.

References Cited in the file of this patent

UNITED STATES PATENTS

| | | |
|---|---|---|
| 1,958,631 | Logan | May 15, 1934 |
| 2,171,362 | Gulliksen | Aug. 29, 1939 |
| 2,653,309 | Hausz | Sept. 22, 1953 |
| 2,668,289 | Conrad et al. | Feb. 9, 1954 |
| 2,691,342 | Johnston et al. | Oct. 12, 1954 |
| 2,769,973 | Denholm et al. | Nov. 6, 1956 |
| 2,775,753 | Kennedy | Dec. 25, 1956 |
| 2,824,360 | Giboney | Feb. 25, 1958 |
| 2,870,430 | Hancock | Jan. 20, 1959 |
| 2,931,916 | Sinn | Apr. 5, 1960 |
| 2,982,404 | Harmon | May 2, 1961 |
| 2,982,943 | Isaacson et al. | May 2, 1961 |
| 3,024,414 | Nordqvist | Mar. 6, 1962 |

FOREIGN PATENTS

| | | |
|---|---|---|
| 764,607 | Great Britain | Dec. 28, 1956 |
| 795,480 | Great Britain | May 21, 1958 |